US012645022B2

(12) United States Patent
Yu

(10) Patent No.: US 12,645,022 B2
(45) Date of Patent: Jun. 2, 2026

(54) BACKLIGHT MODULE

(71) Applicant: AmTRAN TECHNOLOGY Co., Ltd., New Taipei City (TW)

(72) Inventor: Hung-Ta Yu, New Taipei City (TW)

(73) Assignee: AmTRAN TECHNOLOGY Co., Ltd., New Taipei City (TW)

( * ) Notice: Subject to any disclaimer, the term of this patent is extended or adjusted under 35 U.S.C. 154(b) by 0 days.

(21) Appl. No.: 18/909,943

(22) Filed: Oct. 9, 2024

(65) Prior Publication Data

US 2025/0130361 A1    Apr. 24, 2025

(30) Foreign Application Priority Data

Oct. 20, 2023    (TW) ................................. 112140265

(51) Int. Cl.
*F21V 8/00* (2006.01)
(52) U.S. Cl.
CPC ......... *G02B 6/0031* (2013.01); *G02B 6/0016* (2013.01); *G02B 6/0048* (2013.01); *G02B 6/0068* (2013.01)
(58) Field of Classification Search
CPC .. G02B 6/0031; G02B 6/0016; G02B 6/0048; G02B 6/0068
See application file for complete search history.

(56) References Cited

U.S. PATENT DOCUMENTS 8,993,871 B2 * 3/2015 Nishiwaki ............... F24S 23/00
136/246

11,719,977 B2 * 8/2023 Huang .............. G02F 1/133605
362/97.1
11,913,636 B1 * 2/2024 Chen ..................... F21V 7/0016
(Continued)

FOREIGN PATENT DOCUMENTS

| CN | 106842391 | 6/2017 |
| CN | 115930165 | 4/2023 |
(Continued)

OTHER PUBLICATIONS

"Search Report of Europe Counterpart Application", issued on May 12, 2025, p. 1-p. 15.
(Continued)

*Primary Examiner* — Zheng Song
(74) *Attorney, Agent, or Firm* — JCIPRNET

(57) ABSTRACT

A backlight module includes a circuit board, light-emitting elements, an optical element and a reflective element. The light emitting elements are disposed on the circuit board. The light emitting elements are disposed between the optical element and the circuit board. There is no other optical component between the optical element and the light-emitting elements. The optical element has a light guide portion composed of a non-light diffusing material. The reflective element is disposed on the circuit board and is located between the optical element and the circuit board. The reflective element includes a grid portion. The grid portion separates the light emitting elements. The grid portion has openings, and the light-emitting elements are respectively disposed in the openings. A top surface of the grid portion is higher than the light-emitting elements in a first direction, and a gap is between the grid portion and the optical element.

16 Claims, 13 Drawing Sheets

(56)            References Cited

U.S. PATENT DOCUMENTS

| | | | |
|---|---|---|---|
| 2002/0039292 A1 | 4/2002 | Matsui | |
| 2009/0316402 A1* | 12/2009 | Fan | G02F 1/133605 |
| | | | 362/241 |
| 2010/0039812 A1* | 2/2010 | Cheng | G02B 19/0066 |
| | | | 362/241 |
| 2017/0337885 A1* | 11/2017 | Aoki | G02F 1/133606 |
| 2019/0113208 A1* | 4/2019 | Chan | F21V 9/32 |
| 2019/0227382 A1* | 7/2019 | Watanabe | G02B 6/0028 |
| 2020/0049877 A1* | 2/2020 | Watanabe | G02F 1/133606 |
| 2020/0105966 A1* | 4/2020 | Sasaoka | H10H 20/813 |
| 2020/0110311 A1* | 4/2020 | Gordon | G02F 1/133603 |
| 2020/0150333 A1* | 5/2020 | Vasylyev | G02B 6/0055 |
| 2022/0137459 A1* | 5/2022 | Huang | F21S 8/00 |
| | | | 362/97.1 |
| 2022/0146734 A1* | 5/2022 | Watanabe | F21S 2/00 |
| 2022/0206339 A1 | 6/2022 | Sun et al. | |
| 2022/0326570 A1* | 10/2022 | Lee | H01L 25/0753 |
| 2023/0124292 A1* | 4/2023 | Allen | G02F 1/133603 |
| | | | 362/97.1 |
| 2023/0314871 A1* | 10/2023 | Xie | G02B 6/0021 |
| | | | 362/97.1 |
| 2024/0027828 A1* | 1/2024 | Kim | G02F 1/133605 |
| 2024/0280243 A1* | 8/2024 | Kusunoki | F21V 7/0083 |
| 2024/0419034 A1* | 12/2024 | Yasunaga | G02F 1/133611 |

FOREIGN PATENT DOCUMENTS

| | | | | |
|---|---|---|---|---|
| JP | 2013026528 | 2/2013 | | |
| KR | 20210024340 | 3/2021 | | |
| TW | 201219919 | 5/2012 | | |
| WO | 2010151055 | 12/2010 | | |
| WO | 2012023459 | 2/2012 | | |
| WO | 2013015000 | 1/2013 | | |
| WO | WO-2022030138 A1 * | 2/2022 | | G02F 1/133605 |

OTHER PUBLICATIONS

"Office Action of Europe Counterpart Application", issued on Mar. 13, 2026, pp. 1-12.

* cited by examiner

1

BACKLIGHT MODULE

CROSS-REFERENCE TO RELATED APPLICATION

This application claims the priority benefit of Taiwan application serial no. 112140265, filed on Oct. 20, 2023. The entirety of the above-mentioned patent application is hereby incorporated by reference herein and made a part of this specification.

BACKGROUND

Technical Field

The disclosure relates to an optical apparatus, and in particular, to a backlight module.

Description of Related Art

In order to improve the contrast, brightness and other performance of liquid crystal display (LCD) devices, some current LCD device adopt backlight modules having local dimming features with sub-millimeter light-emitting diodes (Mini-LEDs) capable of high brightness light emission. Such backlight modules have multiple dimming zones, wherein each of the dimming zones simultaneously increases the luminance of the backlight sources in the dimming zone when the dimming zone is corresponding to a bright region on the display screen, and the dimming zone simultaneously reduces the luminance of the backlight sources or turns off the backlight sources in the dimming zone when the dimming zone is corresponding to a dark region on the display screen. However, because the size of the dimming zones is much larger than the size of pixels on the display screen, the high luminance of a dimming zone, which is corresponding to a mixed region having a boundary between the bright and dark pixels of the images displayed on the display screen, will cause light leakage to the dark pixels in the mixed region. In addition, the light emitted from the high-brightness dimming zones may also spread to other adjacent low-brightness dimming zones, which causes halo effect on the dark pixels of the image displayed on the display screen.

SUMMARY

The disclosure provides a backlight module that can reduce optical crosstalk between adjacent dimming zones.

A backlight module according to an embodiment of the present disclosure includes a circuit board, light-emitting elements, an optical element, at least one optical film and a reflective element. The light-emitting elements are disposed on the circuit board and are electrically connected to the circuit board. The light-emitting elements include a first light-emitting element and a second light-emitting element. The light-emitting elements are disposed between the optical element and the circuit board. There is no other optical component between the optical element and the light-emitting elements. The optical element has a light guide portion composed of non-light diffusing material. The optical element is disposed between at least one optical film and the light-emitting elements. The reflective element is disposed on the circuit board and located between the optical element and the circuit board. The reflective element includes a grid portion. The grid portion separates the light-emitting elements. The grid portion has openings, and the light-emitting elements are respectively disposed in the openings. A top surface of the grid portion is higher than the light-emitting elements in a first direction. The first direction is substantially perpendicular to the circuit board. A gap is between the grid portion and the optical element. The light guide portion includes at least two first light guide portions, a second light guide portion and at least two third light guide portions. The at least two first light guide portions are respectively aligned to the first light-emitting element and the second light-emitting element. The second light guide portion is located between the at least two first light guide portions, the at least two first light guide portions have a first thickness in the first direction, the second light guide portion has a second thickness in the first direction, and the second thickness is different from the first thickness. The at least two third light guide portions are respectively located between the at least two first light guide portions and the second light guide portion, wherein the at least two third light guide portions have a third thickness in the first direction, the third thickness is greater than the second thickness and the third thickness is difference from the first thickness.

A backlight module according to an embodiment of the present disclosure includes a circuit board, light-emitting elements, an optical element, at least one optical film and a reflective element. The light-emitting elements are disposed on the circuit board and electrically connected to the circuit board. The light-emitting elements include a first light-emitting element and a second light-emitting element. The light-emitting elements are disposed between the optical element and the circuit board. There is no other optical component between the optical element and the light-emitting elements. The optical element has a light guide portion composed of a light-transmitting material. The optical element is disposed between the at least one optical film and the light-emitting elements. The reflective element is disposed on the circuit board and located between the optical element and the circuit board. The reflective element includes a grid portion, located between the light-emitting elements. The grid portion includes a top surface and a plurality of inner side walls. The inner side walls are inclined relative to the circuit board. The top surface is higher than the light-emitting elements in a first direction, the first direction is substantially perpendicular to the circuit board, and a gap is between the grid portion and the optical element.

The backlight module includes a circuit board, a plurality of light-emitting elements, an optical element, at least one optical film and a reflective element. The light-emitting elements are disposed on the circuit board and electrically connected to the circuit board, wherein the light-emitting elements include a first light-emitting element and a second light-emitting element. The light-emitting elements are disposed between the optical element and the circuit board. There is no other optical component between the optical element and the light-emitting elements. The optical element includes a light guide portion, and the light guide portion is composed of a non-light diffusing material. The optical element is disposed between the at least one optical film and the light-emitting elements. The reflective element is disposed on the circuit board, and located between the optical element and the circuit board. The reflective element includes a grid portion located between the light-emitting elements. The reflective element includes a grid portion located between the light-emitting elements, wherein the grid portion includes a top surface and a plurality of inner side walls, the inner side walls are inclined relative to the circuit board, the top surface is higher than the light-emitting elements in a first direction, the first direction is substantially perpendicular to the circuit board, and a gap is between the grid portion and the optical element. The at least one of the inner side walls includes a first inner side wall portion and a second inner side wall portion. The first inner side wall portion is located between the optical element and the circuit board. The second inner side wall portion is located between the optical element and the first inner side wall portion and connected to the first inner side wall portion. The first inner side wall portion forms a first angle with the circuit board, the second inner side wall portion forms a second angle with the circuit board, and the first angle is greater than the second angle.

Based on the above, the backlight module according to one embodiment of the present disclosure uses a reflective element similar to grating to reduce optical crosstalk in adjacent dimming zones. When the backlight module is applied to the local dimming of the display device, the halo phenomenon near the interface between the bright and dark areas of the display screen can be improved.

DESCRIPTION OF THE EMBODIMENTS

Figure 1:
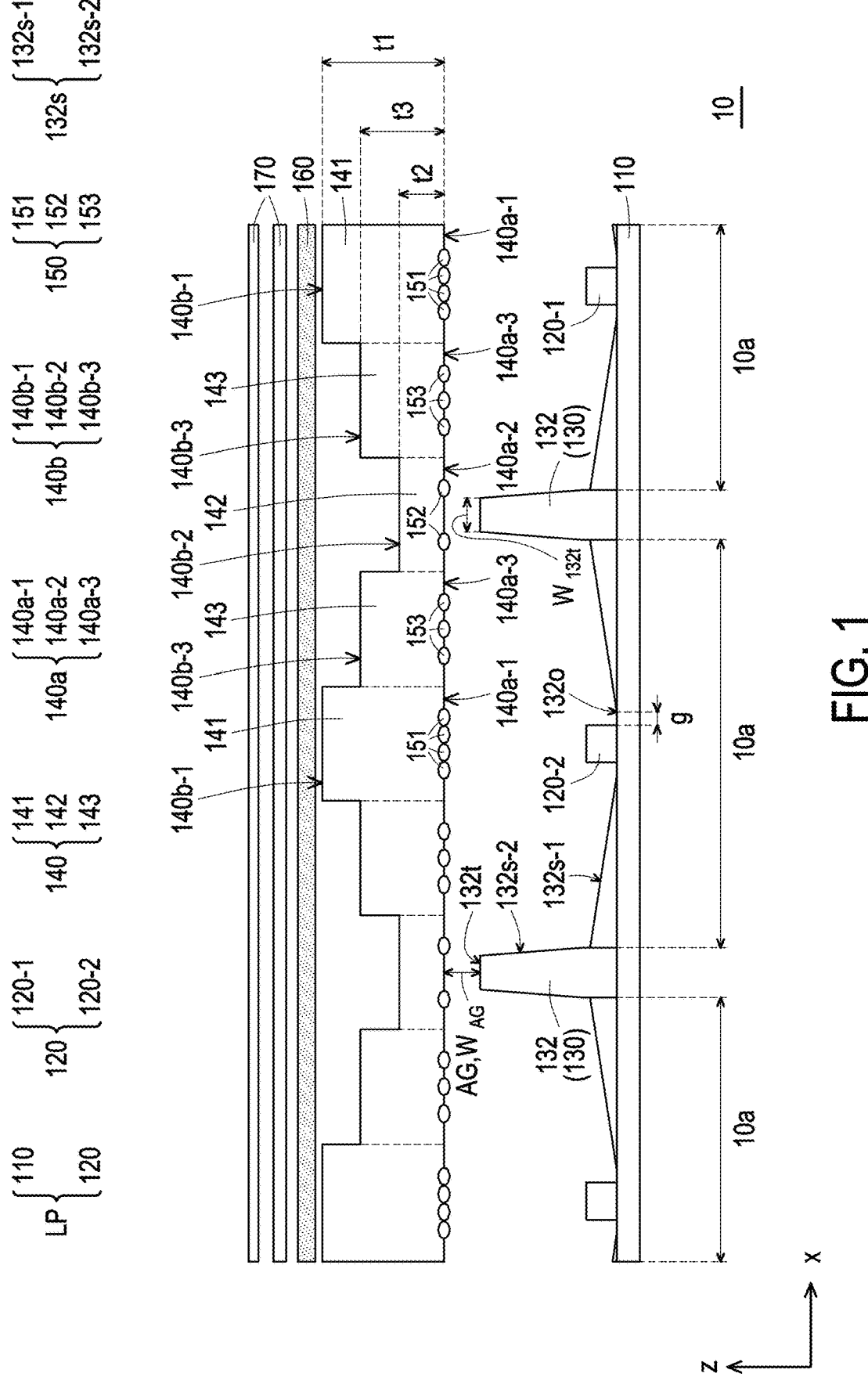
FIG. 1 is a schematic cross-sectional view of a backlight module according to an embodiment of the present disclosure.

FIG. 1 is a schematic cross-sectional view of a backlight module according to an embodiment of the present disclosure. Please refer to FIG. 1, the backlight module 10 includes a circuit board 110 and light-emitting elements 120 disposed on the circuit board 110. The light-emitting elements 120 are electrically connected to the circuit board 110. The circuit board 110 is configured to drive the light-emitting elements 120. The circuit board 110 and the light-emitting elements 120 may form a light board LP. For example, in one embodiment, the circuit board 110 may be a printed circuit board (PCB), and the light-emitting elements 120 may be mini-LEDs, but the present disclosure is not limited to thereto.

The backlight module 10 further includes an optical element 140 and at least one optical film 170. The light-emitting elements 120 are disposed between the optical element 140 and the circuit board 110. The optical element 140 is disposed between the at least one optical film 170 and the light-emitting elements 120. For example, in one embodiment, the number of optical films 170 may be optionally 2, and the optical films 170 may optionally include a brightness enhancement film and a diffuser film. However, the present disclosure is not limited to thereto. In other embodiments, the number and/or types of the optical film 170 can be designed variously according to actual needs.

The optical element 140 has a light guide portion composed of non-light diffusing material. In other words, the optical element 140 has a light guide portion composed of a light-transmitting material. In one embodiment, the optical element 140 is, for example, a light guide plate. The light-emitting elements 120 includes a first light-emitting element 120-1 and a second light-emitting element 120-2 adjacent to each other, and the light guide portion of the optical element 140 includes first light guide portions 141 and a second light guide portion 142, wherein the first light guide portions 141 are aligned to the first light-emitting element 120-1 and the second light-emitting element 120-2 respectively. The normal projection of the second light guide portion 142 onto the circuit board 110 falls between the normal projections of the first light-emitting elements 120-1 and the second light-emitting elements 120-2 onto the circuit board 110. In one embodiment, the optical element 140 further includes third light guide portions 143 between the first light guide portions 141 and the second light guide portion 142 respectively. The first direction z points away from the circuit board 110 and is substantially perpendicular to the circuit board 110. The first light guide portions 141 have a first thickness t1 in the first direction z. The second light guide portion 142 has a second thickness t2 in the first direction z. The third light guide portion 143 has a third thickness t3 in the first direction z.

The optical element 140 has a light incident surface 140a and a light output surface 140b. The light output surface 140b is disposed opposite the light incident surface 140a. The light incident surface 140a is located between the light output surface 140b and the light-emitting elements 120. The light incident surface 140a includes a first sub light incident surface 140a-1, a second sub light incident surface 140a-2 and a third sub light incident surface 140a-3, which respectively belong to the first light guide portion 141, the second light guide portion 142 and the third light guide portion 143. In one embodiment, the first sub light incident surface 140a-1, the second sub light incident surface 140a-2 and the third sub light incident surface 140a-3 may be substantially coplanar. The light output surface 140b of the optical element 140 includes a first sub-light output surface 140b-1, a second sub-light output surface 140b-2 and a third sub-light output surface 140b-3, which respectively belong to the first light guide portion 141, the second light guide portion 142 and the third light guide portion 143.

It is worth noting that the thickness of each of light guide portions of the optical element 140 is designed correspondingly according to the light intensity distribution provided by the light-emitting elements 120 on the light incident surface 140a. Where the light intensity is higher, the thickness of the corresponding light guide portions of the optical element 140 may be designed to be thicker to reduce the light transmittance. Where the light intensity is lower, the thickness of corresponding light guide portions of the optical element 140 can be designed to be thinner to increase light transmittance. In this way, the overall light output uniformity of the backlight module 10 is improved. The following is exemplary and illustrative explanation with FIG. 1 and FIG. 2.

Figure 2:
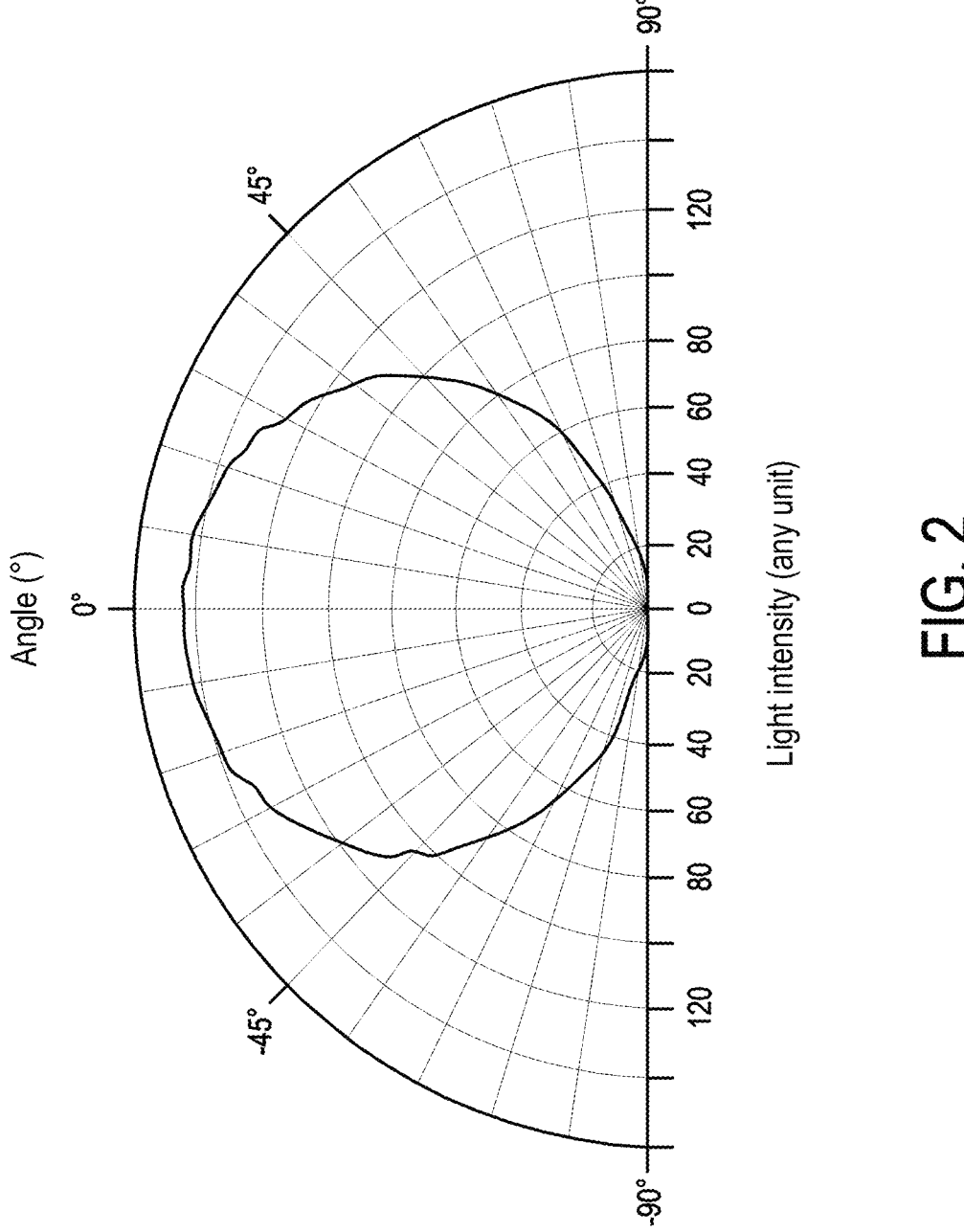
FIG. 2 is a schematic diagram illustrating the light intensity distribution of the light-emitting elements in the backlight module according to an embodiment of the present disclosure.

FIG. 2 is a schematic diagram illustrating the light intensity distribution of the light-emitting elements in the backlight module according to an embodiment of the present disclosure. Please refer to FIG. 1 and FIG. 2. In one embodiment, the light intensity distribution of the light-emitting elements 120 may be Gaussian or Lambertian. When the light intensity distribution of the light-emitting elements 120 is Gaussian or Lambertian, the light emission direction is relatively concentrated. Therefore, on the light incident surface 140a of the optical element 140, the light intensity received at a location is weaker when the location is farther from the locations directly above the light-emitting elements 120. Specifically, in one embodiment, the first sub light incident surfaces 140a-1 are located directly above the light-emitting elements 120 respectively, a second sub light incident surface 140a-2 is located on the periphery between two adjacent first sub light incident surfaces 140a-1, and the third sub light incident surfaces 140a-3 are located respectively between the first sub light incident surfaces 140a-1 and a second sub light incident surface 140a-2. The second sub light incident surfaces 140a-2 are located farther than the adjacent third sub light incident surface 140a-3 from the locations directly above any two adjacent light-emitting elements 120. The light intensity received on the second sub light incident surfaces 140a-2 is less than the light intensity received on the first sub light incident surfaces 140a-1, and the light intensity received on the third sub light incident surfaces 140a-3 is between the light intensity received on the first sub light incident surfaces 140a-1 and the second sub light incident surfaces 140a-2, thereby, the thickness t2 of the second light guiding portion 142 may be designed to be smaller than the thickness t1 of the first light guiding portion 141, and the third thickness t3 of the third light guiding portion 143 may be designed to be larger than the second thickness t2 and smaller than the first thickness t1. This is because the light transmitted to the first sub light incident surface 140a-1, the second sub light incident surface 140a-2 and the third sub light incident surface 140a-3 will respectively have high, low, and medium light intensities. With this design, the light with high light intensity passing through the thick first light guiding portion 141 will have a greater degree of energy loss, the light with low light intensity passing through the thin second light guiding portion 142 will have a smaller degree of energy loss, and the light with medium light intensity passing through the third light guiding portion 143 with a medium thickness will have a moderate degree of energy loss. Therefore, the difference in light intensities of the emitted light can be reduced during the transmission to the first sub light output surface 140b-1, the second sub light output surface 140b-2 and the third sub light output surface 140b-3 through the light guide component 140, thereby improving the light uniformity of the backlight module 10.

For example, in one embodiment, the thickness ratios among the various light guiding portions are: 40%≤(t2/t1) ≤60%, and 70%≤(t3/t1)≤90%. However, the present disclosure is not limited to thereto. In other embodiments, the ratio of the second thickness t2 of the second light guiding portion 142 to the first thickness t1 of the first light guiding portion 141 (t2/t1) and the ratio of the third thickness t3 of the third light guiding portion 143 to the first thickness t1 of the first light guiding portion 141 (t3/t1) can be appropriately designed depending on the change in the light distribution of the light-emitting elements 120. the present disclosure.

Figure 3:
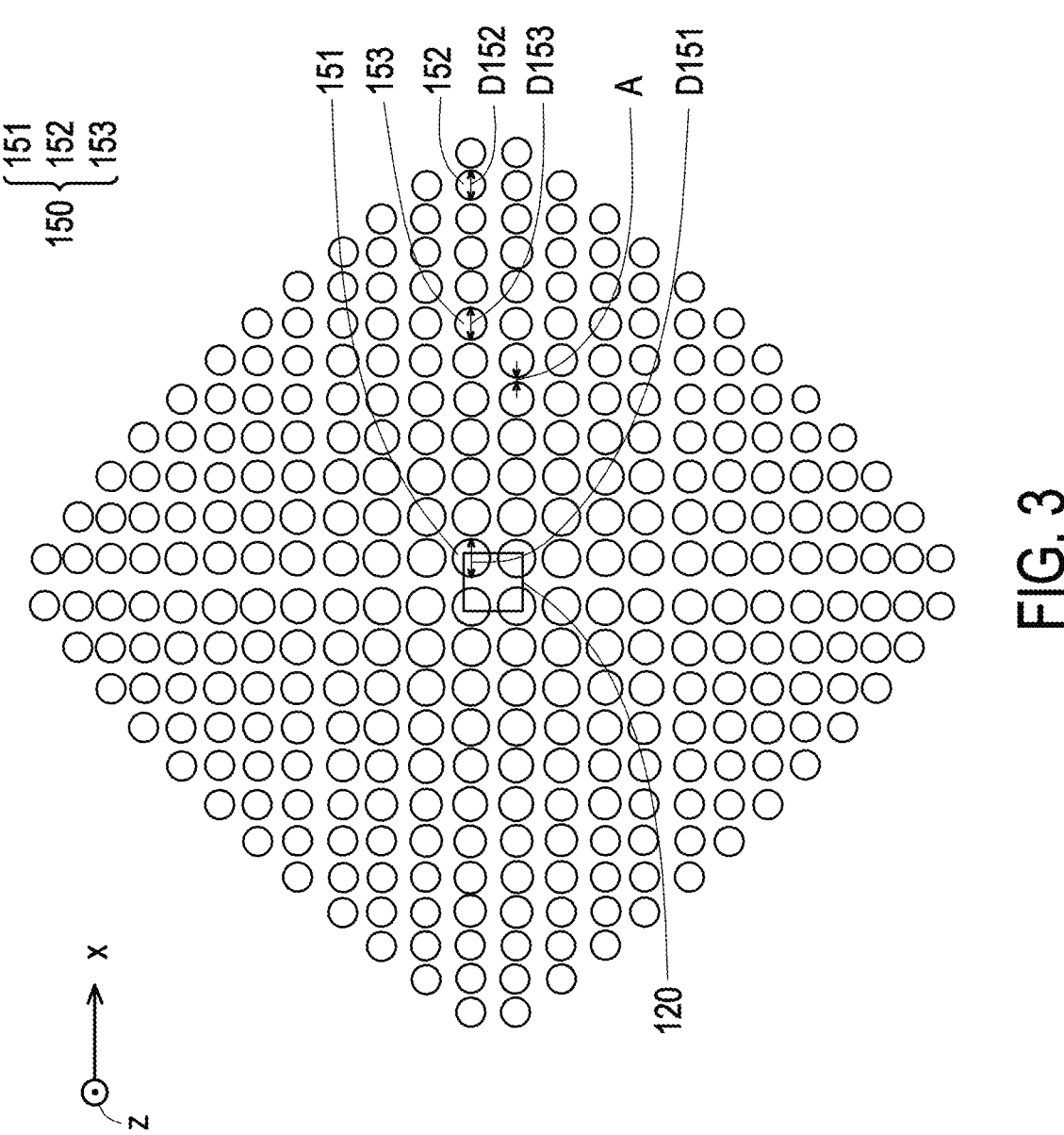
FIG. 3 is a schematic top view of the optical microstructures and light-emitting elements of the backlight module according to an embodiment of the present disclosure.

FIG. 3 is a schematic top view of the optical microstructures and light-emitting elements of the backlight module according to an embodiment of the present disclosure. It should be noted that the optical microstructures 150 shown in FIG. 1 are used to schematically represent the arrangement density of the optical microstructures 150 at various places. The sizes of the optical microstructures 150 shown in FIG. 1 are not necessarily representative of the relative sizes of the optical microstructures 150 located at various locations. Please refer to FIG. 3 for the relative sizes of the optical microstructures 150 located at various locations.

Referring to FIG. 1 and FIG. 3, in some embodiments, the optical element 140 further comprises optical microstructures 150 disposed on the light incident surface 140a of the optical element 140. The Optical microstructures 150 are configured to block and reflect the light emitted by light-emitting elements 120. In some embodiments, the optical microstructures 150 are, for example, micro-indentations. The depth of the micro-indentations is, for example, on the order of several micrometers (μm). The micro-indentations may be formed on the light incident surface 140a by, for example, a hot rolling process, but the present disclosure does not be limited to thereto.

It is worth mentioning that by adjusting the size of the optical microstructures 150 and/or the arrangement density of the optical microstructures 150 on the light incident surface 140a, the hot spots of light intensity can be effectively eliminated and the light uniformity of the backlight module 10 can be further improved.

For example, in some embodiments, the optical microstructures 150 may include first optical microstructures 151, second optical microstructures 152 and third optical microstructures 153. The first optical microstructures 151, the second optical microstructures 152 and the third optical microstructures 153 may be disposed on the first sub light incident surface 140a-1 of the first light guide portion 141, the second sub light incident surface 140a-2 of the second light guide portion 142 and the third sub light incident surface 140a-3 of the third light guide portion 143, respectively. The second direction x is substantially parallel to the circuit board 110, the size D151 (as indicated in FIG. 3) of the first optical microstructure 151 in the second direction x is greater than the size D152 (as indicated in FIG. 3) of the second optical microstructure 152 in the second direction x, and the size D153 (as indicated in FIG. 3) of the third optical microstructure 153 in the second direction x is greater than the size D152 of the second optical microstructure 152 in the second direction x and smaller than the size D151 of the first optical microstructure 151 in the second direction x. In the other word, as the optical microstructures 150 are at locations farther away from the locations directly above the light-emitting elements 120, the sizes of the optical microstructures 150 are decreased to smaller. Specifically, in one embodiment, the size D152 of the second optical microstructure 152 and the size D153 of the third optical micro-structure 153 can be reduced by 1% to 10% of the size D151 of the first optical microstructure 151 in comparison with the size D151 of the first optical microstructure 151. However, the present disclosure is not limited to thereto. In other embodiments, the relative relationship among the size D151 of the first optical microstructure 151, the size D152 of the second optical microstructure 152 and the size D153 of the third optical microstructure 153 may have other appropriate designs corresponding to various light distributions of different light-emitting elements 120. Moreover, the height of the first optical microstructure 151, the height of the second optical microstructure 152 and the height of the third optical microstructure 153 can be changed as well as the horizontal sizes, or the optical microstructures 150 may only have different heights but have the same horizontal size. Both of such optical microstructures designs can also achieve the effect of improving light uniformity. In some embodiments, the first optical microstructures 151 have greater arrangement density than the second optical microstructures 152, and the third optical microstructures 153 have greater arrangement density than the second optical microstructures 152 and less arrangement density than the first optical microstructures 151. In the other word, in some embodiments, the farther the optical microstructures 150 are from the locations directly above the light-emitting elements 120, the wider the spacing A between adjacent optical microstructures 150 is, or the smaller the sizes of the optical microstructures 150 are. However, the present disclosure is not limited to thereto. In other embodiments, the relationship among the arrangement densities of the first optical microstructures 151, the second optical microstructures 152 and the third optical microstructures 153 can be appropriately designed with different height variations of the optical microstructures 150. In addition, other appropriate designs may be used corresponding to various light distributions of the light-emitting elements 120.

Please refer to FIG. 1. In some embodiments, the backlight module 10 may also optionally include a diffuser film 160 disposed between at least one optical film 170 and the optical element 140. The diffuser film 160 can scatter the light output from the light output surface 140b of the optical element 140, thereby further improving the light uniformity of the backlight module 10.

Figure 4:
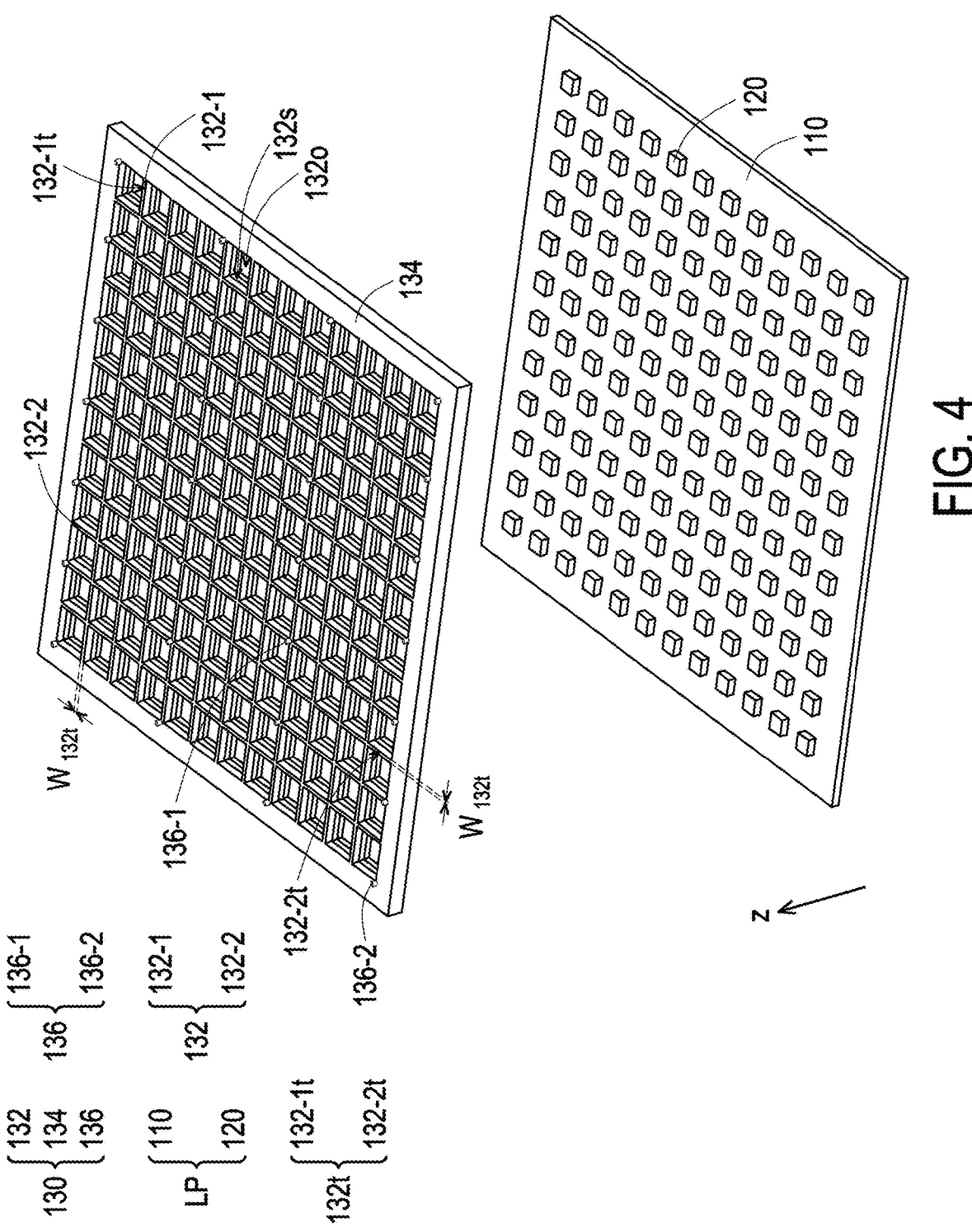
FIG. 4 is a three-dimensional and exploded schematic diagram of the light board and reflective element of the backlight module according to an embodiment of the present disclosure.
Figure 5:
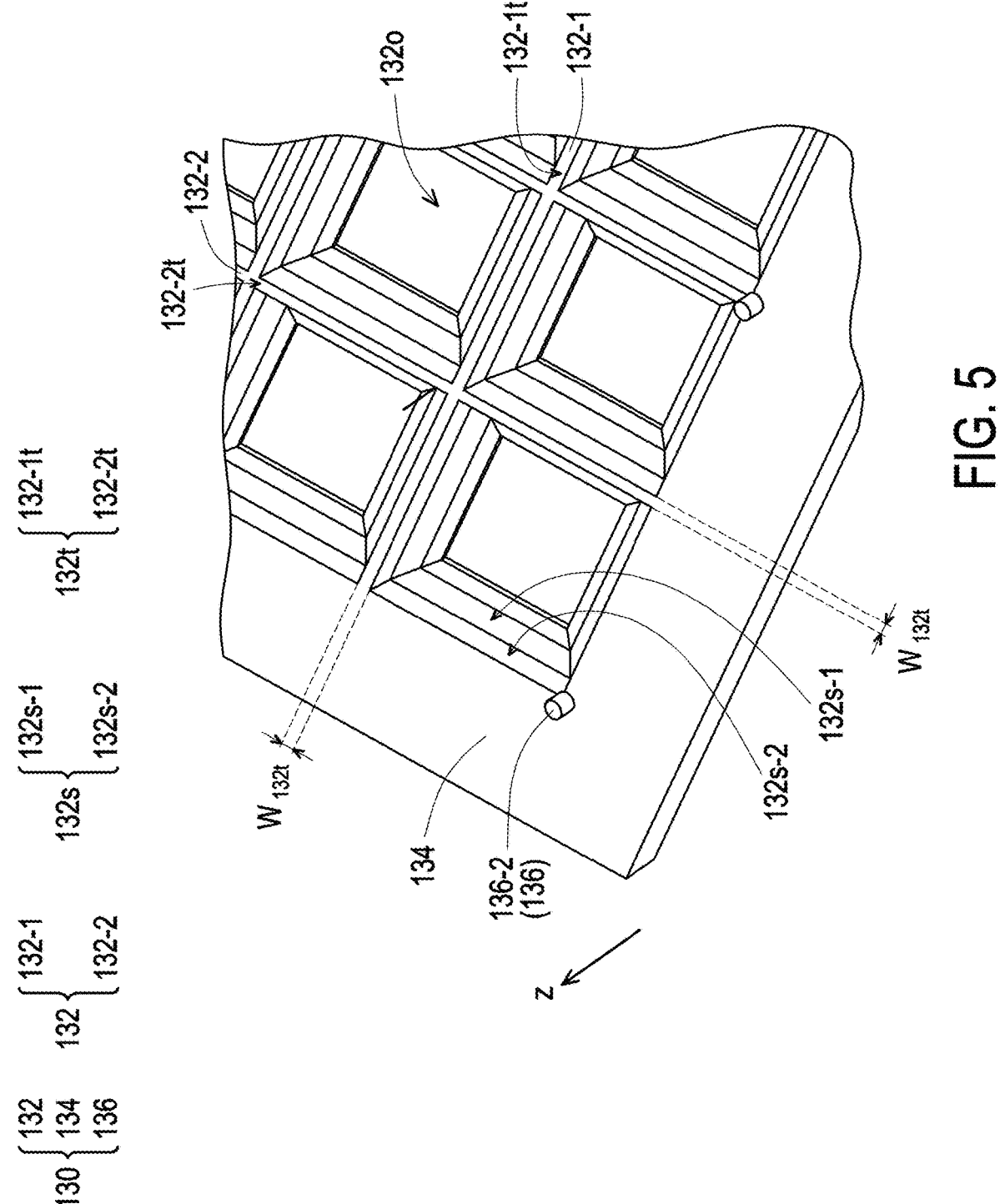
FIG. 5 is a partial three-dimensional and enlarged schematic diagram of the reflective element of the backlight module according to an embodiment of the present disclosure.
Figure 6:
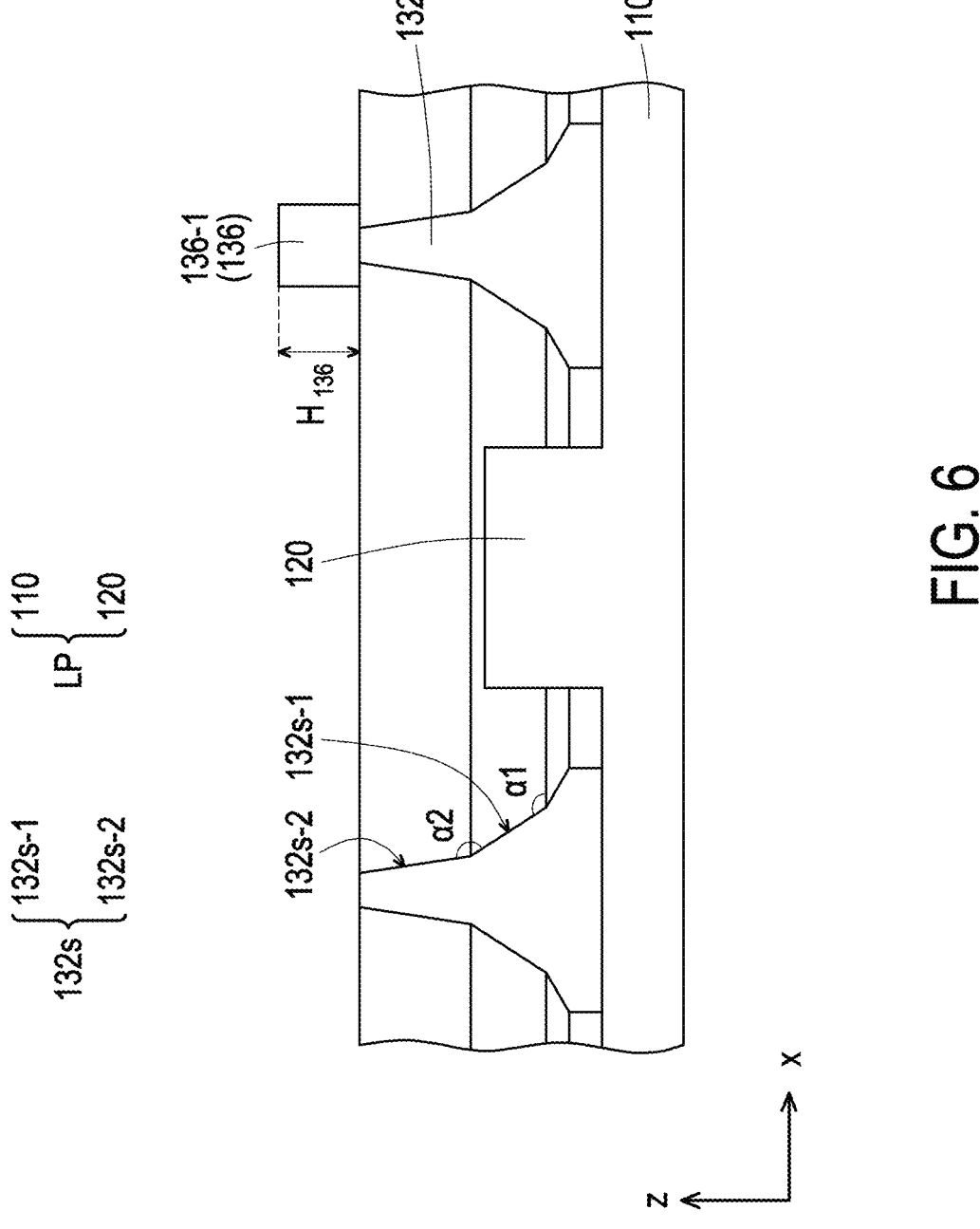
FIG. 6 is a schematic cross-sectional and side view schematic diagram of the light board and reflective element of the backlight module according to an embodiment of the present disclosure.

FIG. 4 is a three-dimensional and exploded schematic diagram of the light board and reflective element of the backlight module according to an embodiment of the present the present disclosure. FIG. 5 is a partial three-dimensional and enlarged schematic diagram of the reflective element of the backlight module according to an embodiment of the present disclosure. FIG. 6 is a schematic cross-sectional and side view schematic diagram of the light board and reflective element of the backlight module according to an embodiment of the present disclosure.

Please refer to FIG. 1 and FIG. 4, the backlight module 10 also includes a reflective element 130. The reflective element 130 is disposed on the circuit board, 110, and is located between the optical element 140 and the circuit board 110. There is no other optical component between the optical element 140 and the light-emitting elements 120. The reflective element 130 includes a grid portion 132 separating light-emitting elements 120 and having openings 1320. The light-emitting elements 120 are respectively disposed in the openings 1320 of the grid portion 132. In some embodiments, a gap g (marked in FIG. 1) may exist between the light-emitting elements 120 and edges of the openings 1320 of the reflective elements 130. Preferably, the size of the gap g falls within the range of 0.5 mm~2 mm, but the present disclosure is not limited to thereto.

The light-emitting elements 120 are respectively mapped to the dimming zones 10a of the backlight module 10. The grid portion 132 of the reflective element 130 functions similar to cavity reflector cells, which can inhibit the light emitted by the light-emitting elements 120 from leaking to the adjacent dimming zones 10a. In this way, when the backlight module 10 is applied in a local dimming display device, the halo phenomenon near the boundary between the bright and dark pixels of the display screen can be improved.

In some embodiments, the reflective element 130 may be made by injection moulding of engineering plastics, such as propylene carbonate (PC), polyethylene terephthalate (PET), propylene-butadiene styrene resin (ABS), . . . , etc., but the present disclosure is not limited to thereto.

Please refer to FIG. 1, FIG. 4, FIG. 5 and FIG. 6, in some embodiments, the reflective element 130 may have inner side walls 132s which respectively form the openings 1320, and the inner side walls 132s are inclined relative to the circuit board 110. Through the reflections of the inner side wall 132s, the light emitted by the light-emitting elements 120 can be more concentratedly transmitted toward right above each of the dimming zone 10a. For example, in one embodiment, each of the inner side wall 132s may include a first inner side wall portion 132s-1 and a second inner side wall portion 132s-2. The first inner side wall portion 132s-1 is located between the optical element 140 and the circuit board 110, and the second inner side wall portion 132s-2 is located between the optical element 140 and the first inner side wall portion 132s-1. The second inner side wall portion 132s-1 is connected to the first inner side wall portion 132s-1. The first inner side wall portion 132s-1 forms a first angle $\alpha 1$ (marked in FIG. 6) with the circuit board, 110, and the second inner side wall portion 132s-2 forms a second angle $\alpha 2$ (marked in FIG. 6) with the circuit board 110. The first angle $\alpha 1$ is larger than the second angle $\alpha 2$. In one embodiment, $135° \leq \alpha 1 < 180°$, and $90° \leq \alpha 2 \leq 135°$. However, the present disclosure is not limited to thereto. The degrees of the first angle $\alpha 1$ and the second angle $\alpha 2$ may be varied and designed based on the light distributions of the light-emitting elements 120.

The grid portion 132 of the reflective element 130 has a top surface 132t, which is higher than the light-emitting elements 120 in a first direction z, the first direction z is substantially perpendicular to the circuit board 110, and the top surface 132t and the optical element 140 are separated by an air gap AG. For example, in some embodiments, the reflective element 130 further includes at least one protruding pillar 136, which is at least disposed on the grid portion 132 and protrudes in the first direction z away from the circuit board 110. Specifically, in some embodiments, the reflective element 130 further includes an outer frame 134 surrounding and connecting to the grid portion 132. The at least one protruding pillar 136 includes a first protruding pillar 136-1 and a second protruding pillar 136-2. The first protruding pillar 136-1 is disposed on the grid portion 132 and protrudes from the grid portion 132 in the first direction z, and the second protruding pillar 136-2 is disposed on the outer frame 134 and protrudes from the outer frame 134 in the first direction z.

In some embodiments, the protruding pillar 136 is configured to support the light incident surface 140a of the optical element 140 to maintain the air gap AG between the optical element 140 and the grid portion 132 of the reflective element 130 (marked in FIG. 1). In some embodiments, the width $W_{AG}$ of the air gap AG in the first direction z is substantially equal to the height H136 of the protruding pillar 136 in the first direction z (marked in FIG. 6).

Theoretically, when the width $W_{AG}$ of the air gap AG in the first direction z is zero, the grid portion 132 has the best effect of preventing optical crosstalk between adjacent dimming zones 10a. However, in practice, if the width $W_{AG}$ of the air gap AG is zero, the grid portion 132 will block the light output directly above the grid portion 132, which will seriously affects the overall light output of the backlight module 10 and results in grid-like shadows on the display screen. Therefore, it is necessary to maintain an air gap AG with appropriate width $W_{AG}$, such that the backlight module 10 can improve the optical crosstalk problem while also ensure the overall light output effect. For example, in some embodiments, the width $W_{AG}$ of the air gap AG may fall in the range of 0.2 mm to 1 mm, but the present disclosure is not limited to thereto.

Referring to FIG. 1, FIG. 4 and FIG. 5, in some embodiments, the grid portion 132 of the reflective element 130 has a top surface 132t facing the optical element 140. The top surface 132t of the grid portion 132 is substantially parallel to circuit board 110. The top surface 132t of the grid portion 132 has width $W_{132t}$ in a second direction x parallel to the circuit board 110. Specifically, the grid portion 132 includes horizontal sub portions 132-1 and perpendicular sub portions 132-2 that cross over each other. The top surface 132t of the grid portion 132 includes top surfaces 132-1t of the horizontal sub portions 132-1 and top surfaces 132-2t of the perpendicular sub portions 132-2. The width $W_{132t}$ of the top surface 132t of the grid portion 132 may refer to the width of one top surface 132-1t of one horizontal sub-portion 132-1 or the width of one top surface 132-2t of one perpendicular sub-portion 132-2. Theoretically, a wider top surface 132t will reduce the light output brightness to the area directly above the top surface 132t, so the width $W_{132t}$ should be as narrow as possible. However, for practical feasibility of mass productions, the width $W_{132t}$ should be designed within an appropriate range based on the material properties of the reflective element 130. For example, in one embodiment, the width $W_{132t}$ may fall in the range of 0.2 mm to 1 mm. Preferably, the width $W_{132t}$ may be substantially equal to 0.4 mm. When the width $W_{132t}$ is designed to be about 0.4 mm, the light utilization efficiency of each of the dimming zones 10a is increased by 8% compared with the case without the grid portion 132, and the light leakage to adjacent dimming zones 10a is reduced by 9%.

In one embodiment, the top surface 132t of the grid portion 132 of the reflective element 130 may have a light reflective layer. Through the reflections of the light reflective layer, the light output brightness to the area directly above the top surface 132t of the grid portion 132 can be increased, which improve overall light output of the backlight module 10 and prevent grid-like shadows on the upper display area. For example, in one embodiment, the light reflective layer may include barium sulfate ($BaSO_4$), titanium oxide ($TiO_2$) and other high light reflectivity materials, but the present disclosure is not limited to thereto.

Please note that the following embodiments have adopted element notations and part of the contents from the previous embodiments, wherein the same notations are used for representing the same or similar elements, and descriptions of the same technical contents are omitted. The descriptions regarding to the omitted parts may be referred to previous embodiments, and thus are not repeated herein.

Figure 7:
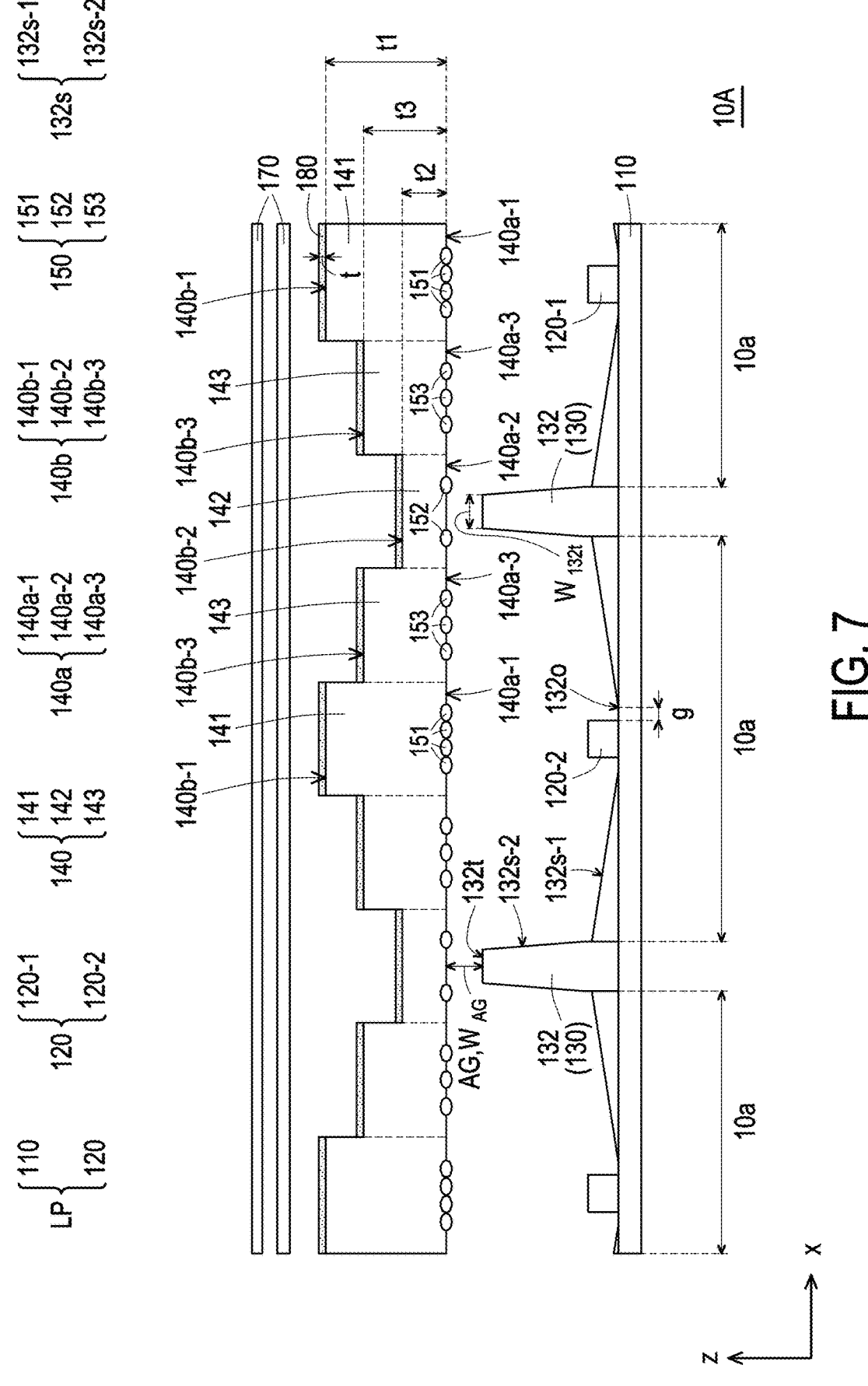
FIG. 7 is a schematic cross-sectional view of the backlight module according to another embodiment of the present disclosure.

FIG. 7 is a schematic cross-sectional view of the backlight module according to another embodiment of the present invention. The backlight module 10A in FIG. 7 is similar to the backlight module 10 in FIG. 1. The difference between the two backlight modules is that the optical element 140 of the backlight module 10A in FIG. 7 has a diffusion layer 180 instead of the diffuser film 160 of the backlight module 10 in FIG. 1.

Please refer to FIG. 7, in some embodiments, the upper part of the optical element 140 has a diffusion layer 180, which is formed on the first sub-light output surface 140b-1, the second sub-light output surface 140b-2 and the third sub-light output surface 140b-3 with height differences. The diffusion layer 180 includes diffusion particles (not shown) that can reflect or refract the light to increase the number of light refractions within the optical element 140. As the result, the transmission scope of the light inside the optical element 140 can be expanded, thereby achieving good light mixing uniformity. For example, in one embodiment, the material of the diffusion particles may be polymethylmethacrylate (PMMA), polystyrene (PS) or titanium oxide ($TiO_2$), but the present disclosure does not be limited to thereto.

The diffusion layer 180 may be formed by coating with diffusion particle ink, and is applied to a required thickness t of the backlight module 10A in the first direction z. For example, in some embodiments, the thickness t may fall in the range of 1 μm to 100 μm, but the present disclosure is not limited thereto. Since the backlight module 10A of FIG. 7 uses the diffusion layer 180 disposed on the light output surface 140b to replace the diffuser film 160 of the backlight module 10 of FIG. 1, the backlight module 10A of FIG. 7 further has the advantage of being thinner than the backlight module 10 of FIG. 1.

Figure 8:
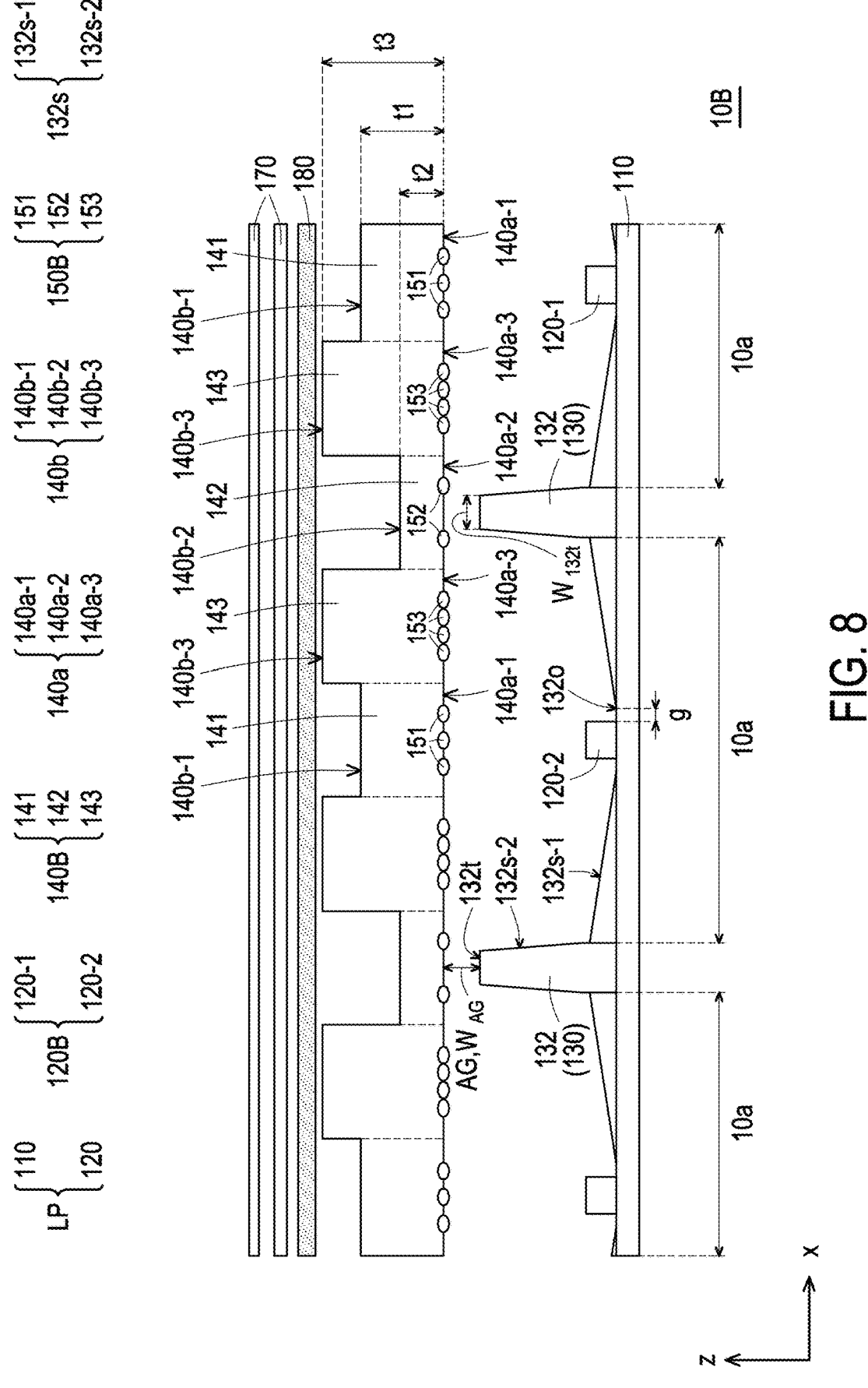
FIG. 8 is a schematic cross-sectional view of the backlight module of another embodiment of the disclosure.

FIG. 8 is a schematic cross-sectional view of the backlight module of another embodiment of the disclosure. The backlight module 10B of FIG. 8 is similar to the backlight module 10 of FIG. 1. The difference between the two backlight modules is that the light intensity distribution of the light-emitting elements 120B of the backlight module 10B of FIG. 8 is different from the light intensity distribution of the light-emitting elements 120 of the backlight module 10 of FIG. 1.

Figure 9:
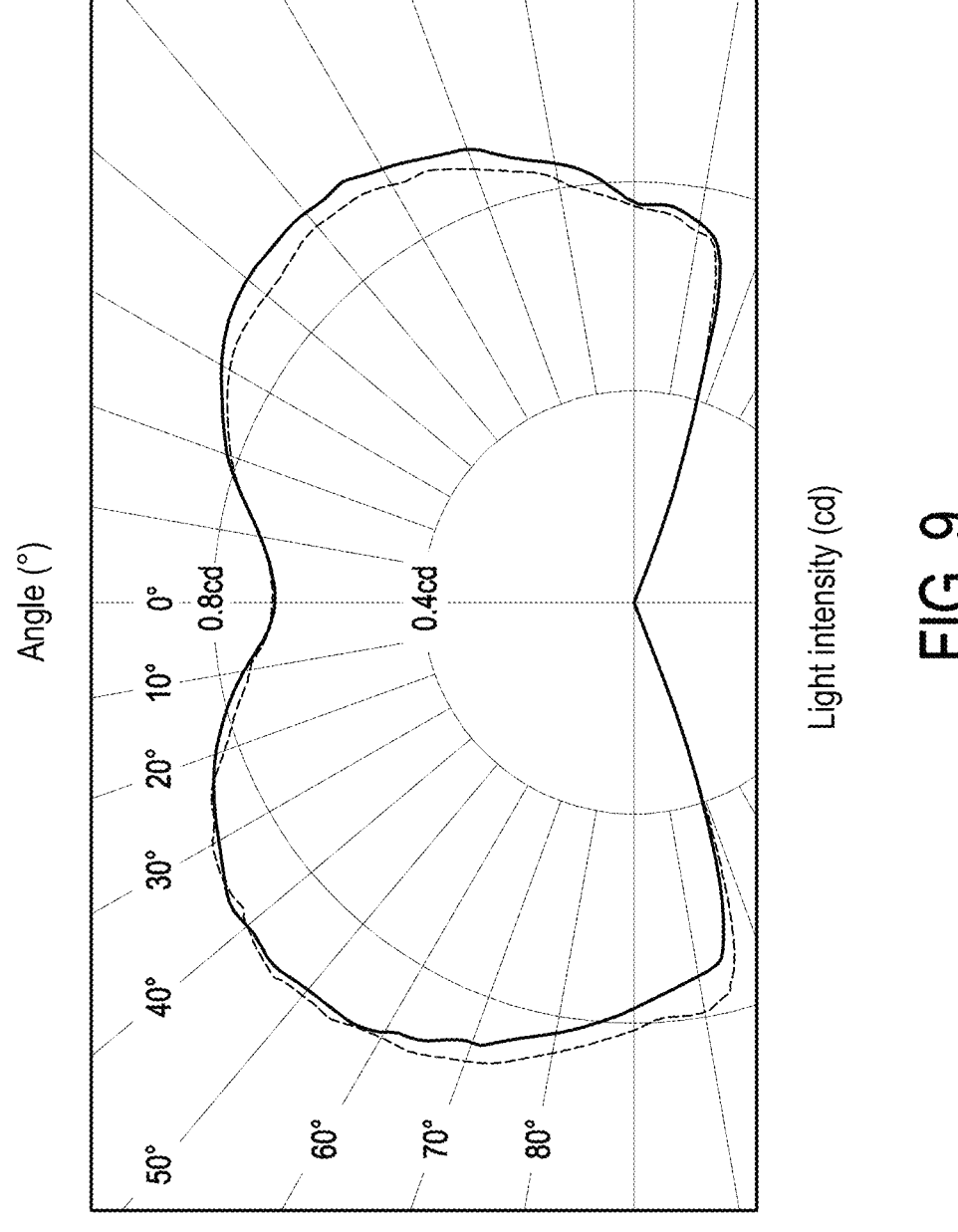
FIG. 9 is a schematic diagram of the light distribution of a light-emitting element of the backlight module of another embodiment of the present disclosure.

FIG. 9 is a schematic diagram of the light distribution of a light-emitting element of the backlight module according to another embodiment of the present disclosure. Please refer to FIG. 8 and FIG. 9, the light distribution of the light-emitting elements 120B of the backlight module 10B is neither Gaussian nor Lambertian. According to the different light distribution of the light-emitting elements 120B, the thickness arrangement of the optical element 140B in the backlight module 10B is different from the light guide element 140 of the above-mentioned embodiment. In addition, the relative sizes and relative arrangement density of the optical microstructures 150B on the light incident surface 140a in the backlight module 10B are also different from the above-mentioned embodiment.

Please refer to FIG. 8 and FIG. 9, specifically, in one embodiment, the light distribution of the light-emitting elements 120B of the backlight module 10B may be a Batwing distribution. In other words, in one embodiment, the light intensity on the third sub light incident surface 140a-3 is greater than the light intensity on the first sub light incident surface 140a-1, and the light intensity on the first sub light incident surface 140a-1 is greater than the light intensity on the second sub light incident surface 140a-2. According to the light intensity distributions provided by the above-mentioned light-emitting elements 120B on the first sub light incident surface 140a-1, the second sub light incident surface 140a-2 and the third sub light incident surface 140a-3, in one embodiment, the third light guide portion 143, having the third sub light incident surface 140a-3, has the third thickness t3 greater than the first thickness t1 of the first light guide portion 141, having the first sub light incident surface 140a-1, and the first light guide portion 141, having the first sub light incident surface 140a-1, has the first thickness t1 greater than the second thickness t2 of the second light guide portion 142, having the second sub light incident surface 140a-2. In this way, the optical element 140B is designed to have thicker thickness at positions where the incident light intensities are higher, and thinner thickness at the positions where the incident light intensities are lower, so as to achieve uniform light output. For example, in one embodiment, $70\% \leq \leq (t1/t3) \leq 90\%$, $40\% \leq (t2/t3) \leq 60\%$, but the present disclosure is not limited to thereto.

Figure 10:
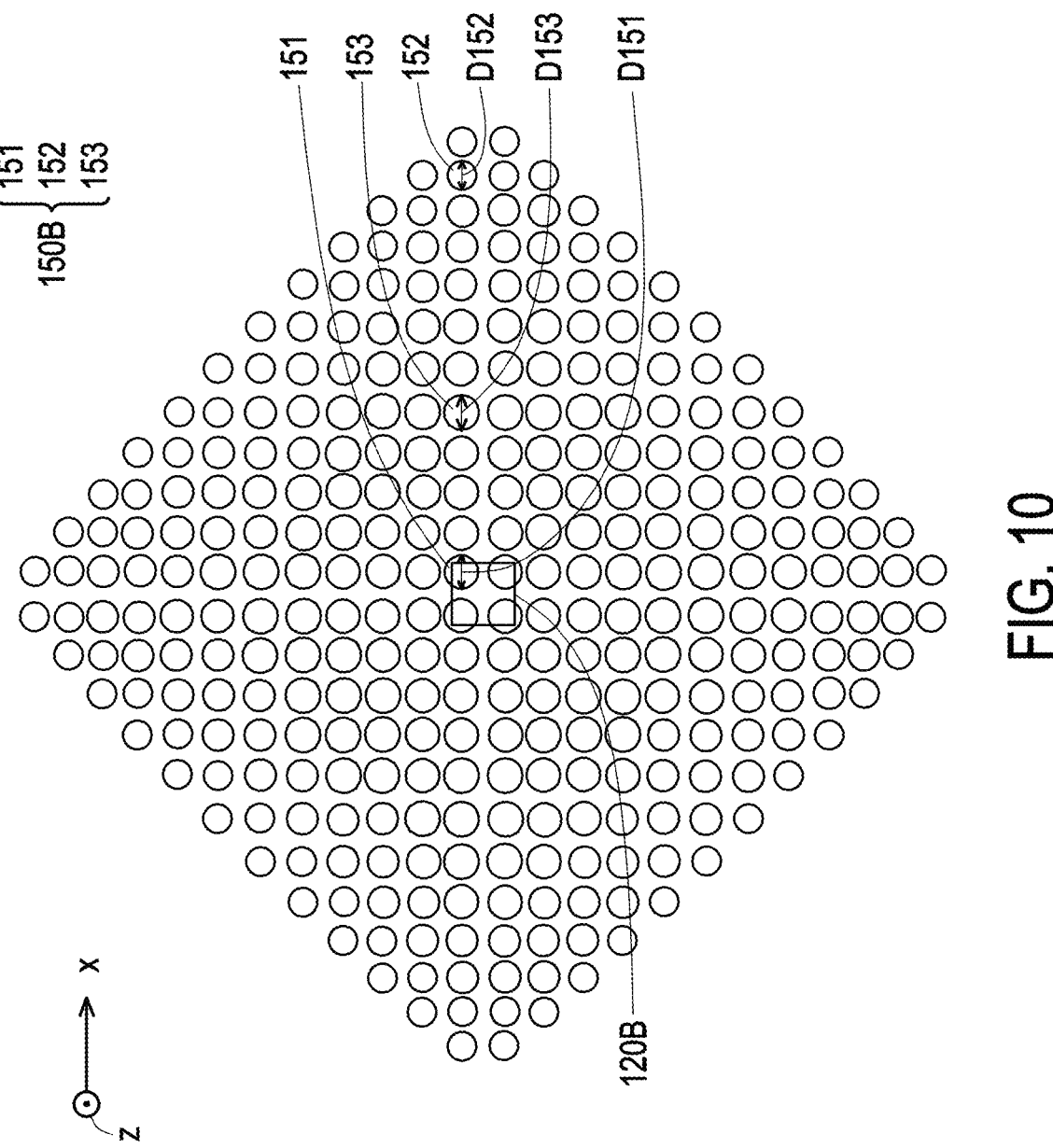
FIG. 10 is a schematic top view of the optical microstructures and light-emitting elements of the backlight module according to another embodiment of the present disclosure.

FIG. 10 is a schematic top view of the optical microstructures and light-emitting elements of the backlight module according to another embodiment of the present disclosure. It should be noted that the optical microstructures 150B shown in FIG. 8 are used to schematically represent the arrangement density of the optical microstructures 150B at various locations, and the sizes of the multiple optical microstructures 150B shown in FIG. 8 do not necessarily represent the relative sizes of the optical microstructures 150B at various locations. The relative sizes of the optical microstructures 150B at various locations can be referred to in FIG. 10

Please refer to FIG. 8, FIG. 9 and FIG. 10, according to the light distribution of the light-emitting elements 120B, in one embodiment, the size D153, in the second direction x, of the third optical microstructure 153 disposed on the third sub light incident surface 140a-3 is greater than the size D151, in the second direction x, of the first optical microstructure 151 disposed on the first sub light incident surface 140a-1, and the size D151, in the second direction x, of the first optical microstructure 151 disposed on the first sub light incident surface 140a-1 is greater than the size D152, in the second direction x, of the second optical microstructure 152 disposed on the second sub light incident surface 140a-2. In one embodiment, the arrangement density of the third optical microstructures 153 disposed on the third sub light incident surface 140a-3 is greater than the arrangement density of the first optical microstructures 151 disposed on the first sub light incident surface 140a-1, and the arrangement density of the first optical microstructures 151 disposed on the first sub light incident surface 140a-1 is greater than the arrangement density of the second optical microstructures 152 disposed on the second sub light incident surface 140a-2.

Figure 11:
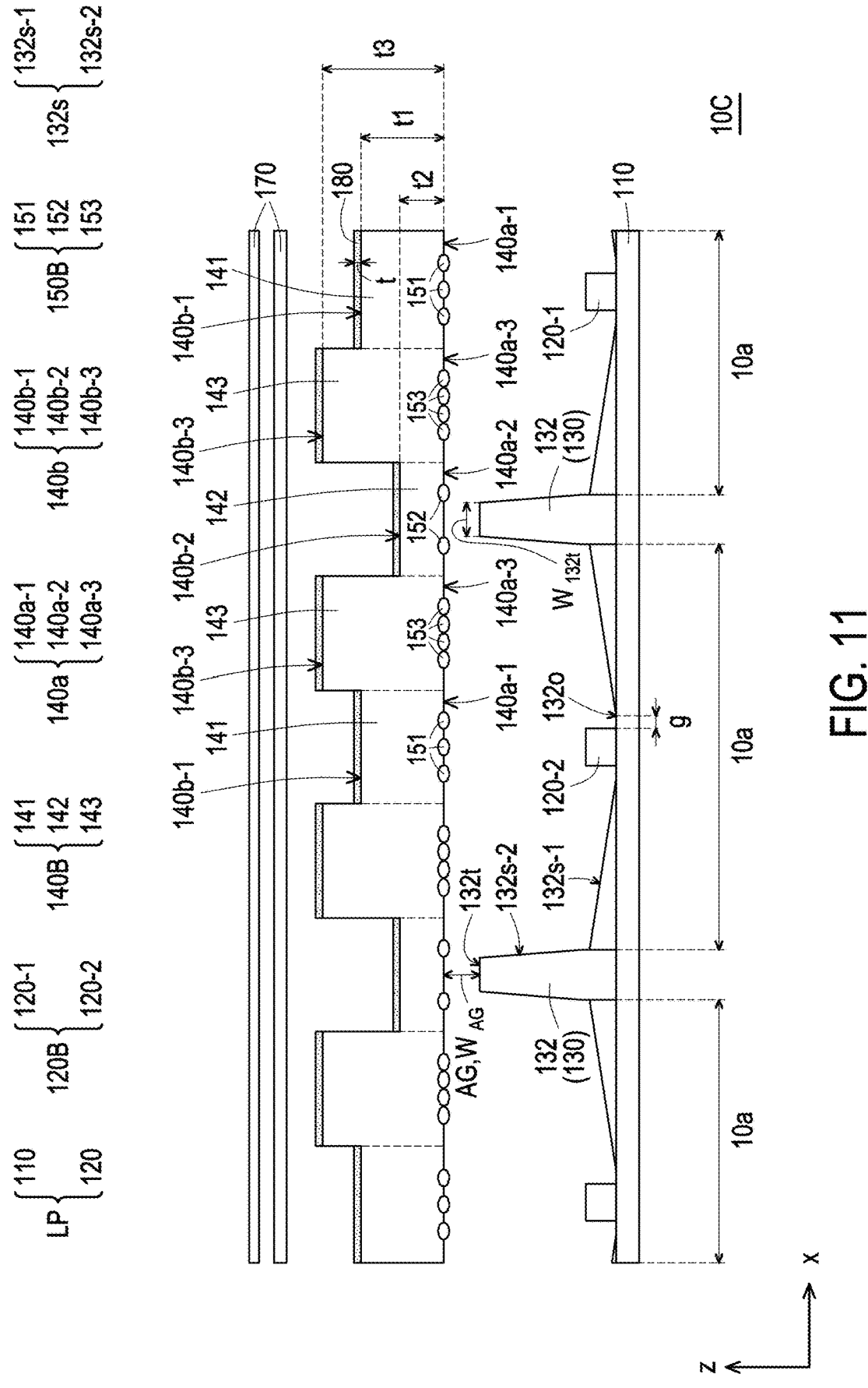
FIG. 11 is a schematic cross-sectional view of the backlight module of yet another embodiment of the disclosure.

FIG. 11 is a schematic cross-sectional view of the backlight module of yet another embodiment of the disclosure. The backlight module 10C of FIG. 11 is similar to the backlight module 10B of FIG. 8. The difference between the two backlight modules is that the backlight module 10C of FIG. 11 includes the diffusion layer 180 but does not include the diffuser film 160 of the backlight module 10B of FIG. 8.

Please refer to FIG. 11, in one embodiment, the backlight module 10C includes a diffusion layer 180, which is formed on the first sub-light output surface 140b-1, the second sub-light output surface 140b-2 and the third sub-light output surface 140b-3 with height differences. The diffusion layer 180 may be used to replace the diffuser film 160 in the backlight module 10B of FIG. 8 to form the backlight module 10C of FIG. 11. Since the backlight module 10C of FIG. 11 uses the diffusion layer 180 disposed on the light output surface 140b, the backlight module 10C of FIG. 11 further has the advantage of being thinner than the backlight module 10B of FIG. 8.

Figure 12:
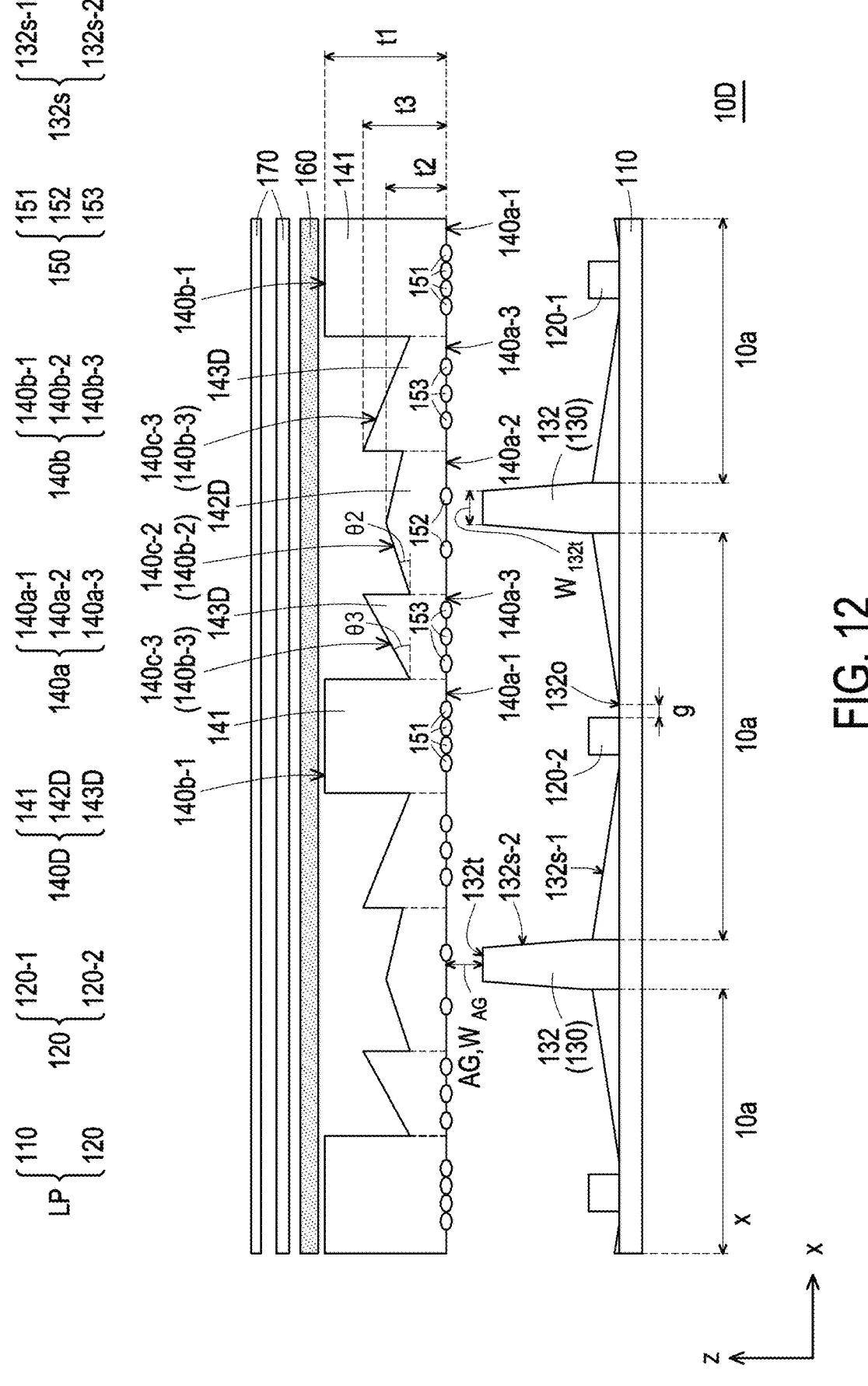
FIG. 12 is a schematic cross-sectional view of a backlight module according to an embodiment of the present disclosure.

FIG. 12 is a schematic cross-sectional view of a backlight module according to an embodiment of the present disclosure. The backlight module 10D of FIG. 12 is similar to the backlight module 10 of FIG. 1. The difference between the two backlight modules is that the light guide element 140D of the backlight module 10D of FIG. 12 is different from the light guide element 140 of the backlight module 10 of FIG. 1.

Please refer to FIG. 12, in one embodiment, the light guide element 140D can adopt a special-shaped light guide plate design having polygonal structures. Specifically, in one embodiment, at least one of the first sub-light output surface 140b-1 of the first light guide portion 141, the second sub-light output surface 140b-2 of the second light guide portion 142D, and the third sub-light output surface 140b-3 of the third light guide portion 143D may include at least one of inclined sub surface 140c-2 or 140c-3, wherein the at least one inclined sub surface 140c-2 or 140c-3 is inclined relative to the circuit board 110 at one of the angle θ2 or θ3. The light intensity distribution on the light output surface 140b can be adjusted by at least one inclined sub-surface 140c-2 or 140c-3 at the at least one angle θ2 or θ3 to the circuit board 110. In other words, by changing the at least one angle θ2 and θ3, different light intensity distribution effects can be achieved.

For example, in one embodiment, the second sub-light output surface 140b-2 of the second light guide portion 142D may include an inclined sub-surface 140c-2, and the inclined sub-surface 140c-2 is inclined at an angle θ2 relative to the circuit board 110. The third sub-light output surface 140b-3 of the guide portion 143D may include an inclined subsurface 140c-3, and the inclined subsurface 140c-3 is inclined at an angle θ3 relative to the circuit board 110, wherein θ3>θ2. However, the present disclosure is not limited to thereto. In other embodiments, the relative inclination degrees of the inclined sub surfaces 140c-2 and 140c-3 can be designed differently depending on the desired light intensity distribution effect.

Figure 13:
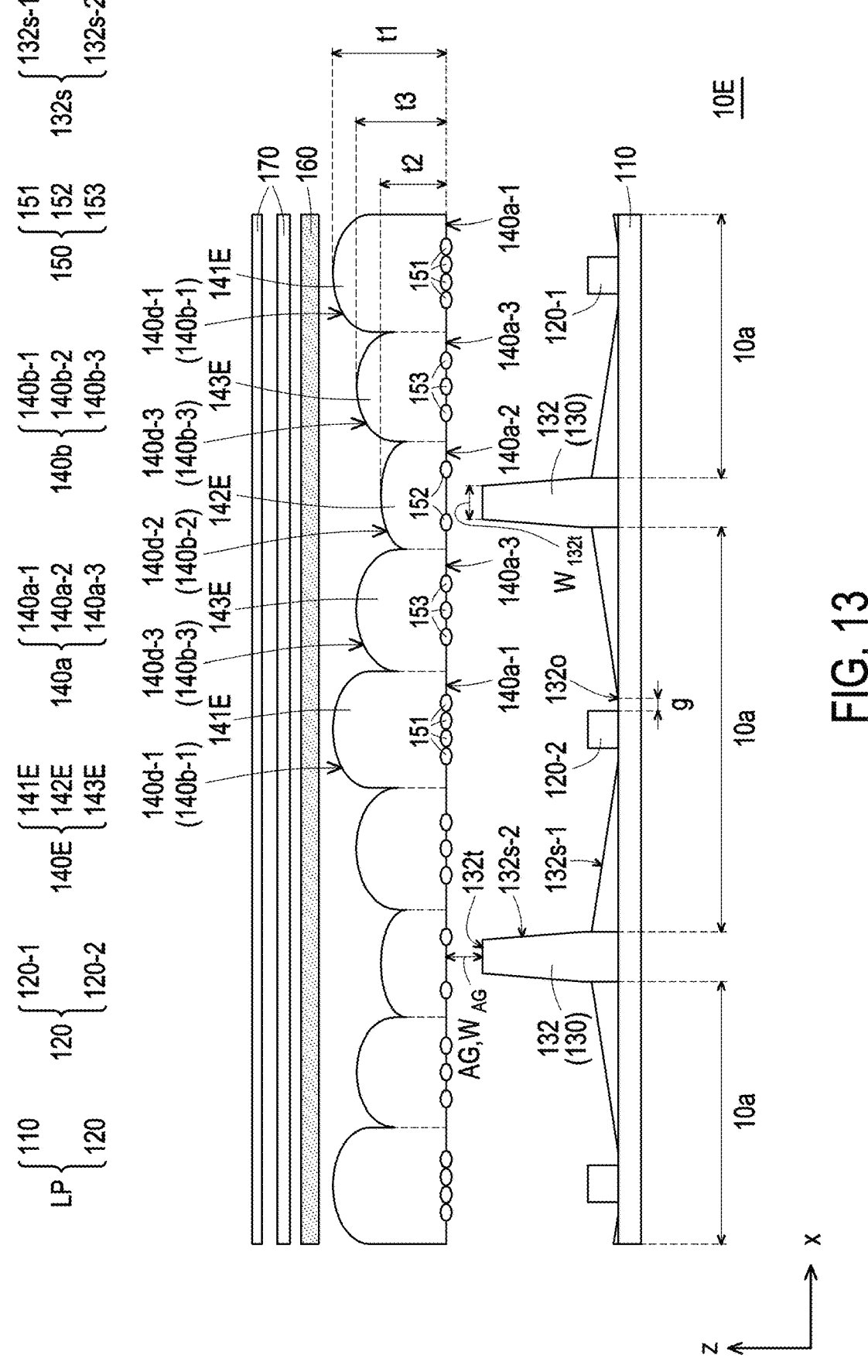
FIG. 13 is a schematic cross-sectional view of the backlight module of another embodiment of the disclosure.

FIG. 13 is a schematic cross-sectional view of the backlight module of another embodiment of the disclosure. The backlight module 10E of FIG. 13 is similar to the backlight module 10 of FIG. 1. The difference between the two backlight modules is that the light guide element 140E of the backlight module 10E of FIG. 13 is different from the light guide element 140 of the backlight module 10 of FIG. 1.

Please refer to FIG. 13, in one embodiment, the light guide element 140E can adopt a special-shaped light guide plate design having spherical structures. Specifically, in one embodiment, at least one of the first sub-light output surface 140b-1 of the first light guide portion 141E, the second sub-light output surface 140b-2 of the second light guide portion 142E, and the third sub-light of the third light guide portion 143E may include at least one of the sub-convex surfaces 140d-1, 140d-2, or 140d-3. By changing the radius of curvature of at least one sub-convex surface 140d-1, 140d-2, or 140d-3, the light intensity distribution on the light output surface 140b can be controlled, thereby achieving different light intensity distribution effects.

For example, in one embodiment, the first sub-light output surface 140b-1 of the first light guide portion 141E, the second sub-light output surface 140b-2 of the second light guide portion 142E, and the third sub-light output surface 140b-3 of the third light guide portion 143E may respectively include sub-convex surface 140d-1, sub-convex surface 140*d*-2 and sub-convex surface 140*d*-3, wherein the radius of curvature of sub-convex surface 140*d*-2 may be greater than the radius of curvature of sub-convex surface 140*d*-1, and the radius of curvature of sub-convex surface 140*d*-3 may be between the radius of curvature of sub-convex surface 140*d*-2 and the radius of curvature of sub-convex surface 140*d*-1. However, the present disclosure is not limited to thereto. In other embodiments, the relative radius of curvatures of the sub-convex surfaces 140*d*-1, 140*d*-2, and 140*d*-3 may be designed differently depending on the desired light intensity distribution effect. In addition, in some embodiments, the light guide element 140D of FIG. 12 and the light guide element 140E of FIG. 13 may include the diffusion layer 180, and the backlight module 10D and the backlight module 10E do not include the diffuser film 160 to achieve a thinner design.

It should be noted that in FIG. 1, FIG. 7, FIG. 8, FIG. 11, FIG. 12 and FIG. 13, the illustrated first optical microstructure 151, the second optical microstructure 152 and the third optical microstructure 153 are only schematic diagrams representing differences in the arrangement density, and do not depict the specific quantities, sizes and positions of the first optical microstructure 151, the second optical microstructure 152 and the third optical microstructure 153 on the first sub light incident surface 140*a*-1, the second sub light incident surface 140*a*-2 and the third sub light incident surface 140*a*-3. As mentioned above, the sizes, the arrangement densities and the structural heights of the first optical microstructures 151, the second optical microstructures 152 and the third optical microstructures 153 can be changed to achieve the effect of improving light uniformity with various light sources.

In summary, the backlight module according to an embodiment of the present disclosure includes light-emitting elements, an optical element and at least one optical film. The optical element is disposed between at least one optical film and the light-emitting elements. The optical element includes a first light guide portion aligned to the light-emitting elements and a second light guide portion located away from the light-emitting elements. In particular, the thickness of the first light guide portion and the thickness of the second light guide portion are designed differently according to the light distribution of the light-emitting elements, and optical microstructures are arranged on the light incident surface corresponding to the light distribution. In this way, the light output uniformity of the backlight module can be improved.

In addition, compared with the traditional direct-type backlight modules, which require a space of about 1 cm height for the traditional diffuser plates and optical films, the backlight module of the present invention replaces the diffuser plate with an optical element having microstructures. Under the condition of using the same quantity of light-emitting elements 120, the height of the optical cavity within the backlight module of the present disclosure can be reduced to 2.5 cm, and the thickness of the optical film only needs 2.5 cm, which can better meet the requirements of thin display devices. In addition, the present disclosure adopts a reflective element similar to grids to reduce the light cross-talk between adjacent dimming zones in the backlight module. When the backlight module is adopted in a local dimming display device, the halo phenomenon near the boundary between the bright and dark pixels of the display screen can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A backlight module comprising:
a circuit board;
a plurality of light-emitting elements disposed on the circuit board and electrically connected to the circuit board, wherein the light-emitting elements comprise a first light-emitting element and a second light-emitting element adjacent to the first light-emitting element;
an optical element, wherein the light-emitting elements are disposed between the optical element and the circuit board, there is no other optical component between the optical element and the light-emitting elements, the optical element has a light guide portion, and the light guide portion is composed of a non-light diffusing material;
at least one optical film, wherein the optical element is disposed between the at least one optical film and the light-emitting elements; and
a reflective element disposed on the circuit board, and located between the optical element and the circuit board, wherein the reflective element comprises:
a grid portion separating the light-emitting elements, wherein the grid portion has openings, the light-emitting elements are respectively disposed in the openings, the grid portion has a top surface higher than the light-emitting elements in a first direction, the first direction is substantially perpendicular to the circuit board, and a gap is between the grid portion and the optical element;
wherein the light guide portion comprises:
at least two first light guide portions, wherein the at least two first light guide portions are respectively aligned to the first light-emitting element and the second light-emitting element;
a second light guide portion, wherein the second light guide portion is located between the at least two first light guide portions, the at least two first light guide portions have a first thickness in the first direction, the second light guide portion has a second thickness in the first direction, and the second thickness is different from the first thickness; and
at least two third light guide portions respectively located between the at least two first light guide portions and the second light guide portion, wherein the at least two third light guide portions have a third thickness in the first direction, the third thickness is greater than the second thickness and the third thickness is different from the first thickness.

2. The backlight module according to claim 1, wherein the top surface has at least one protruding pillar, and the at least one protruding pillar supports the optical element.

3. The backlight module according to claim 1, wherein the top surface of the grid portion has a light reflective layer.

4. The backlight module according to claim 1, wherein the reflective element further comprises:
an outer frame surrounding the grid portion and connected to the grid portion, wherein the outer frame has at least one protruding pillar, and the at least one protruding pillar supports the optical element.

5. The backlight module according to claim 1, wherein the reflective element has inner side walls form the openings, and the inner side walls are inclined relative to the circuit board.

6. The backlight module according to claim 5, wherein each of the inner side walls comprises:

a first inner side wall portion, located between the optical element and the circuit board; and a second inner side wall portion located between the optical element and the first inner side wall portion and connected to the first inner side wall portion;

wherein the first inner side wall portion forms a first angle with the circuit board, the second inner side wall portion forms a second angle with the circuit board, and the first angle is greater than the second angle.

7. The backlight module according to claim 1, wherein the optical element further comprises:

a first sub light incident surface and a first optical microstructure disposed on the first sub light incident surface;

a second sub light incident surface and a second optical microstructure disposed on the second sub light incident surface;

wherein a first arrangement density of the first optical microstructure on the first sub light incident surface is greater than a second arrangement density of the second optical microstructure on the second sub light incident surface.

8. The backlight module according to claim 7, wherein the optical element further comprises:

a third sub light incident surface and a third optical microstructure disposed on the third sub light incident surface;

wherein the third sub light incident surface is located between the first sub light incident surface and the second sub light incident surface, a third arrangement density of the third optical microstructure on the third sub light incident surface is greater than the second arrangement density of the second optical microstructure on the second sub light incident surface.

9. A backlight module comprising:

a circuit board;

a plurality of light-emitting elements, disposed on the circuit board and electrically connected to the circuit board, wherein the light-emitting elements comprise a first light-emitting element and a second light-emitting element;

an optical element, wherein the light-emitting elements are disposed between the optical element and the circuit board, there is no other optical component between the optical element and the light-emitting elements, the optical element comprises a light guide portion, the light guide portion is composed of a light-transmitting material;

at least one optical film, wherein the optical element is disposed between the at least one optical film and the light-emitting elements; and a reflective element, disposed on the circuit board, and located between the optical element and the circuit board, wherein the reflective element comprises:

a grid portion located between the light-emitting elements, wherein the grid portion comprises a top surface and a plurality of inner side walls, the inner side walls are inclined relative to the circuit board, the top surface is higher than the light-emitting elements in a first direction, the first direction is substantially perpendicular to the circuit board, and a gap is between the grid portion and the optical element, wherein at least one of the inner side walls comprises:

a first inner side wall portion, located between the optical element and the circuit board; and a second inner side wall portion located between the optical element and the first inner side wall portion, wherein the second inner side wall is inclined related to the circuit board and directly connected to the first inner side wall portion and a part of the top surface of the grid portion;

wherein the first inner side wall portion forms a first angle with the circuit board, the second inner side wall portion forms a second angle with the circuit board, and the first angle is greater than the second angle;

wherein the optical element further comprises:

a first sub light incident surface and a first optical microstructure disposed on the first sub light incident surface;

a second sub light incident surface and a second optical microstructure disposed on the second sub light incident surface;

wherein a first arrangement density of the first optical microstructure on the first sub light incident surface is greater than a second arrangement density of the second optical microstructure on the second sub light incident surface.

10. The backlight module according to claim 9, wherein the optical element further comprises:

a third sub light incident surface and a third optical microstructure disposed on the third sub light incident surface;

wherein the third sub light incident surface is located between the first sub light incident surface and the second sub light incident surface, a third arrangement density of the third optical microstructure on the third sub light incident surface is greater than the second arrangement density of the second optical microstructure on the second sub light incident surface.

11. A backlight module comprising:

a circuit board;

a plurality of light-emitting elements disposed on the circuit board and electrically connected to the circuit board, wherein the light-emitting elements comprise a first light-emitting element and a second light-emitting element;

an optical element, wherein the light-emitting elements are disposed between the optical element and the circuit board, there is no other optical component between the optical element and the light-emitting elements, the optical element comprises a light guide portion, and the light guide portion is composed of a non-light diffusing material;

at least one optical film, wherein the optical element is disposed between the at least one optical film and the light-emitting elements; and a reflective element disposed on the circuit board, and located between the optical element and the circuit board, wherein the reflective element comprises:

a grid portion separating the light-emitting elements, wherein the reflective element has a top surface higher than the light-emitting elements in a first direction, the first direction is substantially perpendicular to the circuit board, at least one protruding pillar is disposed on the top surface, and the protruding pillar supports the optical element;

wherein the optical element further comprises:

a first sub light incident surface and a first optical microstructure disposed on the first sub light incident surface;

a second sub light incident surface and a second optical microstructure disposed on the second sub light incident surface;

wherein a first arrangement density of the first optical microstructure on the first sub light incident surface is greater than a second arrangement density of the second optical microstructure on the second sub light incident surface;

a third sub light incident surface and a third optical microstructure disposed on the third sub light incident surface;

wherein the third sub light incident surface is located between the first sub light incident surface and the second sub light incident surface, a third arrangement density of the third optical microstructure on the third sub light incident surface is greater than the second arrangement density of the second optical microstructure on the second sub light incident surface.

12. The backlight module according to claim 11, wherein the grid portion comprises a plurality of openings and a plurality of inner side walls, the light-emitting elements are respectively disposed in the openings, and the inner side walls are inclined relative to the circuit board.

13. The backlight module according to claim 12, wherein each of the inner side walls comprises:

a first inner side wall portion, located between the optical element and the circuit board; and a second inner side wall portion located between the optical element and the first inner side wall portion and connected to the first inner side wall portion;

wherein the first inner side wall portion forms a first angle with the circuit board, the second inner side wall portion forms a second angle with the circuit board, and the first angle is greater than the second angle.

14. The backlight module according to claim 13, wherein the first inner side wall portion is close to one of the light-emitting elements than the second inner side wall portion in a second direction, and the second direction is substantially parallel to the circuit board.

15. The backlight module according to claim 11, wherein the top surface of the grid portion has a light reflective layer.

16. The backlight module according to claim 11, wherein the reflective element further comprises:

an outer frame surrounding the grid portion and connected to the grid portion, wherein the at least one protruding pillar is disposed on the top surface of the outer frame.

* * * * *